United States Patent [19]

Gossler et al.

[11] Patent Number: 5,799,173
[45] Date of Patent: Aug. 25, 1998

[54] DYNAMIC WORKLOAD BALANCING

[75] Inventors: Thomas Gossler, Stuttgart; Gerhard Stark, Althengstett, both of Germany

[73] Assignee: International Business Machines Corporation, Armonk, N.Y.

[21] Appl. No.: 861,188

[22] Filed: May 21, 1997

Related U.S. Application Data

[63] Continuation of Ser. No. 504,810, Jul. 20, 1995, abandoned.

[30] Foreign Application Priority Data

Jul. 25, 1994 [EP] European Pat. Off. ............... 94111579

[51] Int. Cl.$^6$ ........................................... G06F 9/46
[52] U.S. Cl. ..................... 395/500; 395/500; 395/600; 364/975.5
[58] Field of Search ....................... 364/975.5, 492; 395/500, 600, 650

[56] References Cited

U.S. PATENT DOCUMENTS

| | | | |
|---|---|---|---|
| 5,223,897 | 6/1993 | Georgiadis | 395/650 |
| 5,249,290 | 9/1993 | Heizer | 395/650 |
| 5,504,894 | 4/1996 | Ferguson et al. | 395/650 |

FOREIGN PATENT DOCUMENTS

| | | | |
|---|---|---|---|
| 0384339 | 8/1990 | European Pat. Off. | G06F 9/46 |
| 8707463 | 12/1987 | WIPO | G06F 11/20 |

OTHER PUBLICATIONS

"Load Balancing Policies in Heterogeneous Distributed Systems", Jin-Long Wang et al., System Theory, 1994 Southeastern Symposium, IEEE May 1994, pp. 473-477.

"A Comparative Study of Load Sharing in Heterogeneous Multicomputer Systems" Sayed A. Banawan, 1992 IEEE, pp. 22-31.

"A Dynamic Load Balancing Policy with a Central Job Dispatcher" Hwa-Chin Lin 1991 IEEE, pp. 264-271.

Kung, A. et al., "Galaxy: A Distributed Real-Time Operating System Supporting High Availability", Proceedings Real-Time Systems Symposium, Dec. 3, 1985, San Diego, CA. pp. 79-87.

Malla, V.J. et al., "Threshold Policies for Load Sharing in Heterogeneous Systems", Phoenix Conf. on Computer and Communications, Mar. 27, 1991, Scottsdale, AZ, pp. 100-105.

Meyer, Bertrand, *Object-oriented Software Construction*, Prentice Hall International (UK) Ltd., ISBN 0-13-629049-3, Chapter 5.2.1, p. 71, 1988.

*Primary Examiner*—Kevin J. Teska
*Assistant Examiner*—A. S. Roberts
*Attorney, Agent, or Firm*—Lawrence D. Cutter

[57] ABSTRACT

A method for dynamically controlling the number of servers in a transaction system comprising at least one service unit for processing service requests is disclosed. Each service unit comprises a queue for receiving and queuing the incoming service requests and a plurality of servers for executing the service requests. The method comprises a first step of monitoring the current number of service requests and the current number of servers allocated to each one of the service units, a second step of determining an optimized number of servers for each one of the service units dependent on the current number of service requests and the current number of servers, and a third step of allocating the optimized number of servers for each one of the service units.

14 Claims, 7 Drawing Sheets

DYNAMIC WORKLOAD BALANCING

This application is a continuation of application Ser. No. 08/504,810 filed Jul. 20, 1995 now abandoned.

BACKGROUND OF THE DISCLOSURE

The invention relates to dynamic workload balancing in message driven transaction environments.

DESCRIPTION OF THE PRIOR ART

In message driven transaction environments the communication with the user interface and/or other application processes is based on messages put into queues. A message can be considered as a service request or a reply (e.g. a funds transfer request, an inquiry request) sent from one client process to a server process or vice versa.

FIG. 1 shows a typical client/server concept. A server 10 is installed in a network 15 and provides services to at least one client 20. Such a service can be for example to inquire information about a customer. The network 15 can comprise a plurality of servers 10 and a plurality of clients 20, whereby the services are requested by the clients and provided by the servers. The terms "clients" and "servers" are exchangeable since a client can request a service from a server which can further request services as a client. It is to be understood that servers or clients can be any type of processes, computer programs or the like. The server 10 comprises a request queue 25 in order to receive the requests for a service from the client 20. The server 10 processes the requests from the request queue 25 and sends an appropriate reply to the respective client 20 which is first put in a reply queue 30 of the client 20. The client 20 then eventually receives the reply from the reply queue 30. It is clear that several interactions between clients and servers can be processed simultaneously by parallel and/or serial processing. Also, that each server or client can comprise a plurality of queues.

The client/server scenario basically requires one of the following two configurations for the processing of the requests. In the first configuration, the server 10 is pre-started and waits for the arrival of service request messages from any one of the clients in the request queue 25. When a request arrives in the request queue 25, the server 10 processes the request, sends back a reply, and waits for the next request.

To obtain a parallel processing of the incoming requests, several processing units of one server 10 may be pre-started, waiting to process service requests of the same request queue 25 of the server 10. This improves the performance and the load on the server 10, especially when the servers perform input/output (I/O) operations (e.g. accessing a database) or initiate secondary message flows to other servers in response to an initial service request.

In the second configuration of the client/server scenario, the server 10 is only started (e.g. automatically by an initiator process) when a service request message is put into the request queue 25. When the request has been processed finally, the server 10 terminates and another processing unit will be started to process the next request.

The appropriate mechanism must be selected considering performance and resource utilization. However, both alternatives require demanding management methods or complex manual interactions due to the dynamic behavior of the system. Since the system workload (e.g. messages per hour) may vary during a business day (e.g. a customer provides a large number of service requests on a tape, or no requests are available for processing) several problems can occur.

One problem might be that the pre-started processing units of the server 10 are idle because of a low workload. System resources, such as storage, disk space or dispatching lists, are occupied and may impact the performance of other system users.

Another problem might be that the number of pre-started processing units of the server 10 is too small to process a high number of request messages in the queue 25 within a satisfactory response time. The central processing unit (CPU) may not be fully utilized within this scenario because the server 10 may wait for I/O operations to be completed before the next requests are processed. In the case that only one processing unit is applied by the server 10, all incoming requests are processed completely sequentially.

Yet another problem might be that the starting of an additional server in consequence of the arrival of a request message results in a high system overhead due to the starting and stopping of processes.

SUMMARY OF THE INVENTION

It is therefore an object of the invention to provide a transaction system with a high performance and utilization of the system resources and a low system overhead.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
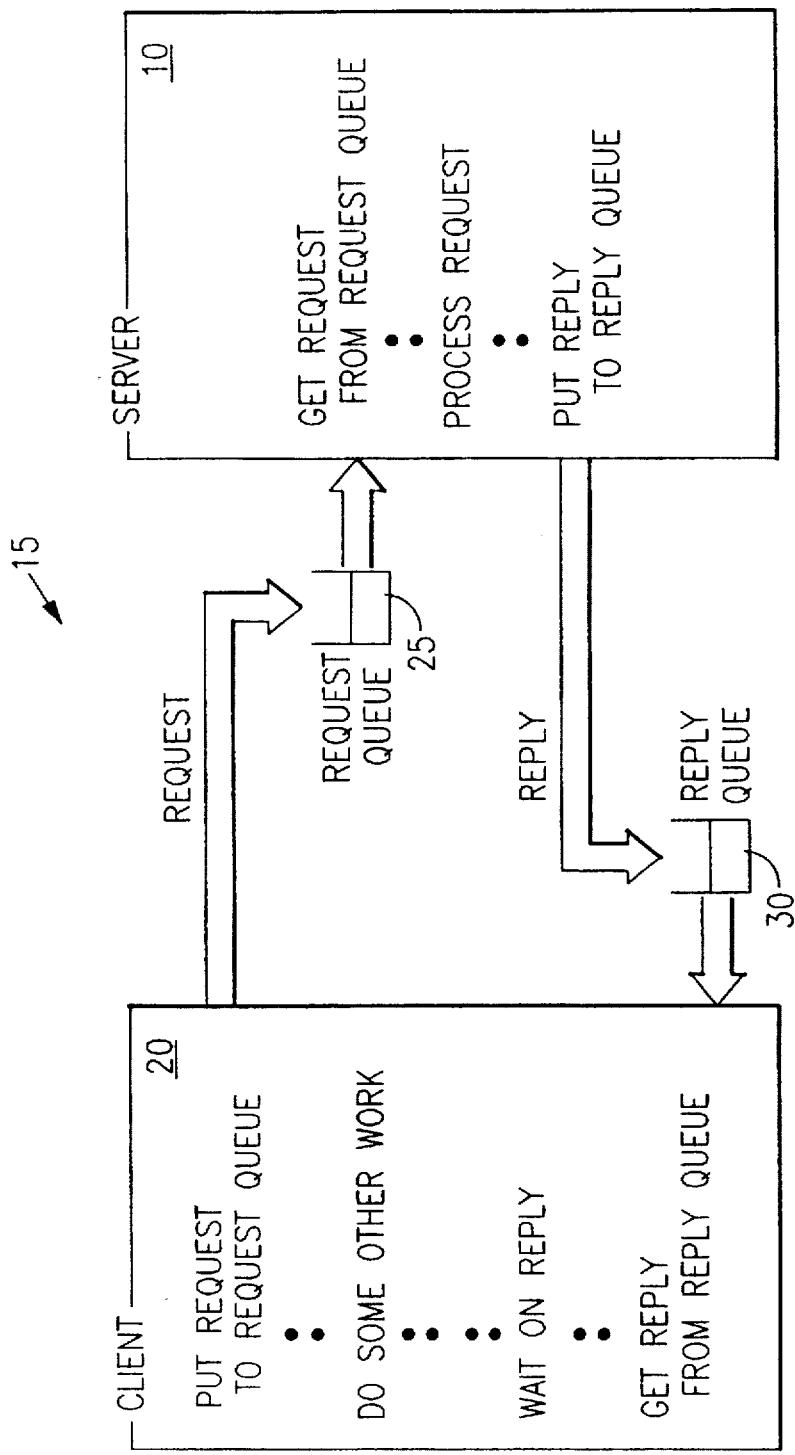
FIG. 1 shows a typical client/server concept.
Figure 2:
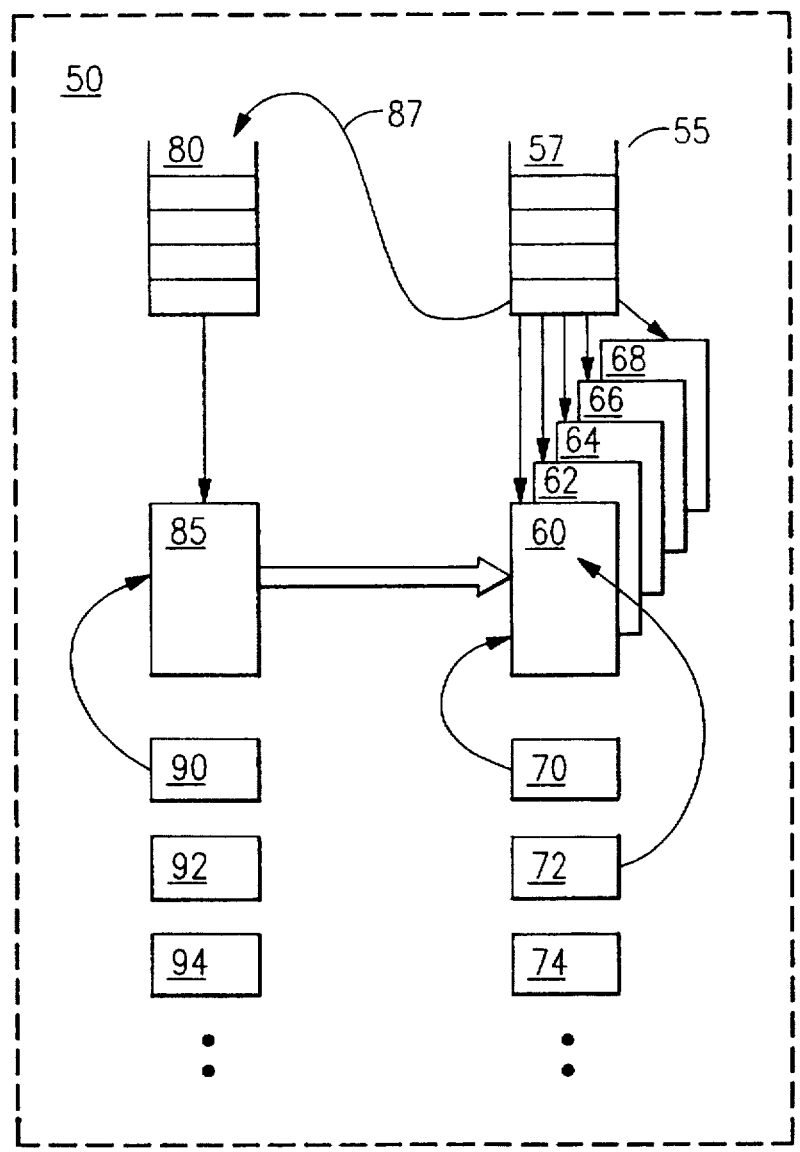
FIG. 2 shows an embodiment of a message driven transaction system according to the invention.

FIG. 2 shows an embodiment of a message driven transaction system according to the invention. The system comprises at least one service point 50 which further comprises at least one service unit 55. For the sake of clarity, only one service point with one service unit 55 is shown in FIG. 2 in order to explain the principles of the invention. The service unit 55 contains a service unit queue 57 for receiving the service requests from any one of the clients 20 connected with the service point 50. The service unit queue 57 is linked with a plurality of servers 60–68, whereby the servers 60–68 carry out the service requests queued in the service unit queue 57. Each one of the servers 60–68 is further linkable with a plurality of service routines 70–74 in order to carry out the requested service, whereby each one of the service routines 70–74 carries out modular steps of the requested service. It is also to be understood that each one of the servers 60–68 can also issue service requests to any other server or resource manager.

An example of the processing of the servers 60–68 is shown in FIG. 2 for the server 60 only, but is equivalent for every other server. Server 60 receives one of the service requests from the service unit queue 57. The service request provides information (e.g. the type of the requested service, data required for the service) required for the processing of the service. The server then links the corresponding service routines, in the example service routines 70 and 72, and carries out the requested service by employing the service routines 70 and 72.

The service point 50 further contains an initiation queue 80 connected with a queuing monitor 85. When the very first service request appears in the service unit queue 57, a trigger message 87 is generated by the queuing system and sent into the initiation queue 80. The queuing monitor 85 receives the trigger message 87 which contains the name of the service unit queues 57 and the name of the servers to be started. The queuing monitor 85 then monitors and controls the servers 60–68 for each one of the service units 55 of the service point 50. The method of the monitoring and controlling applied by the queuing monitor 85 will be explained later.

Figure 3:
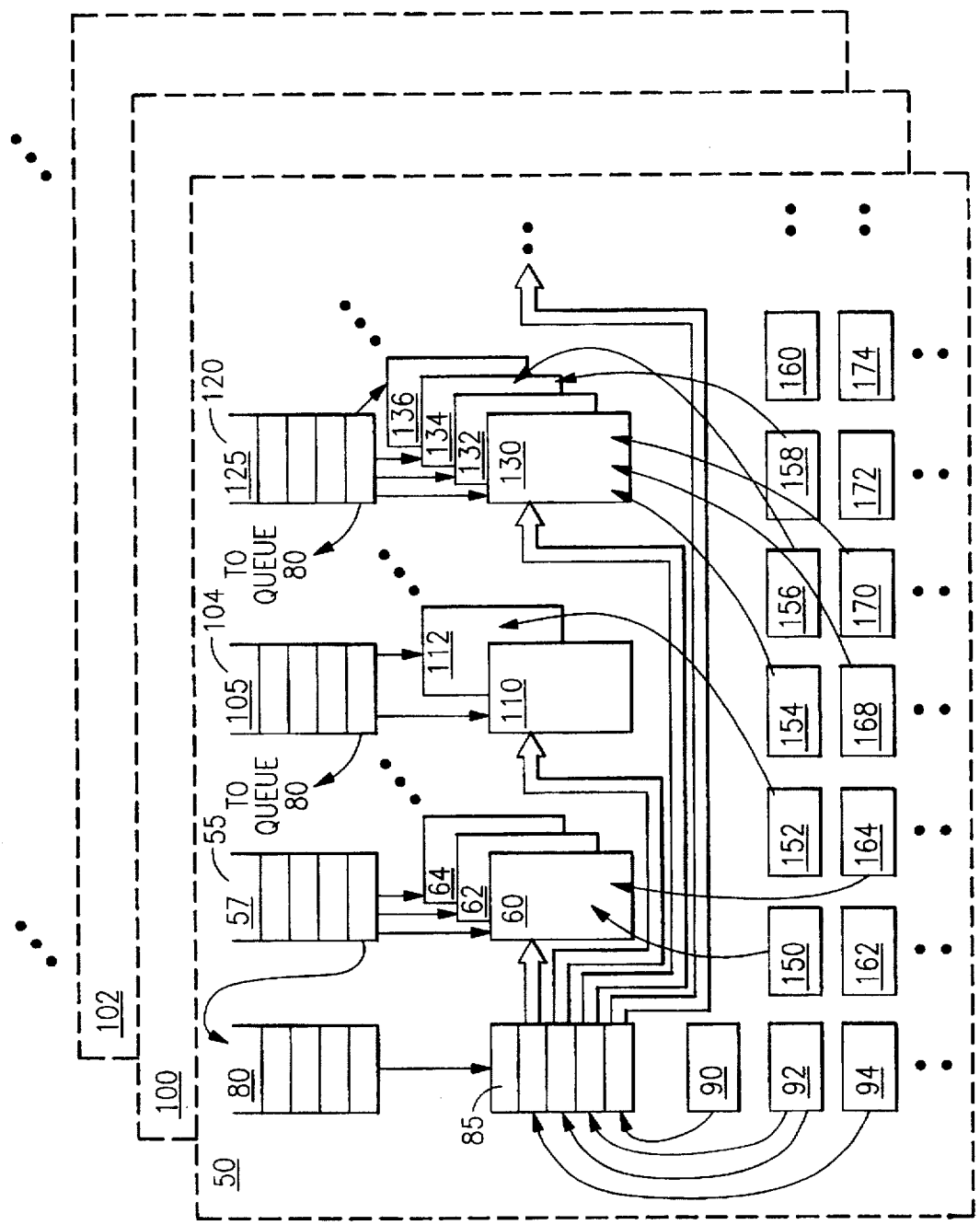
FIG. 3 shows an embodiment of the message driven transaction system with a plurality of service points.

FIG. 3 shows an embodiment of the message driven transaction system with a plurality of service points 50, 100 and 102 which further comprise a plurality of service units 55, 104 and 120. For the sake of clarity, reference signs which refer to the same features as in FIG. 2 will be maintained. Service point 50 exemplarly shows a plurality of service units 55, 104 and 120. Service unit 104 comprises a service unit queue 105 which is linked to servers 110 and 112. Service unit 120 comprises a service unit queue 125 which is linked to servers 130–136. Each one of the servers 60–64, 110–112 and 130–136 is linkable to a plurality of service routines 150–174, whereby only a few of those links is indicated in FIG. 3, and provides services dependent on the information within the respective service request. Each one of the servers can also issue service requests that can be secondary requests in order to process an initial service requests.

Each one of the service units 55, 104 and 120 sends their respective trigger message into the initiation queue 80 when the service unit queues 57, 105 or 125 receive their very first service requests respectively. The queuing monitor 85 receives the trigger messages and links corresponding setup profiles from the plurality of setup profiles 90–94 for each one of the service units 55, 104 and 120. It is clear that each setup profile 90–94 is linkable for a plurality of service units and not customized for only one specific service unit. The queuing monitor 85 then monitors and controls the number of the servers for each one of the service units 55, 104 and 120.

The service points 100 and 102 can be built up accordingly whereby the numbers of service units and respective execution numbers in each service point can vary.

The queuing monitor 85 in FIG. 2 and 3 provides a dynamic workload balancing and a defined structure (which will be explained in FIG. 7) for the processes of the server 10. The dynamic workload balancing will be explained in the following whereby the reference signs of FIG. 2 are preferably used for the sake of clarity.

The queuing monitor 85 receives the control information about each service unit 55 to be monitored from the selected setup profiles 90–94 which contain the following customer defined service unit parameters:

1. The name(s) of the service unit queue(s) 57 to be monitored, whereby multiple service unit queues within one service point 50 can be monitored by one queuing monitor 85.

2. The name(s) of the associated server(s) 60–68 of the respective service unit 55 for the processing of the incoming service requests.

3. The minimum number of servers for each service unit 55. This minimum number corresponds to the number of server processes within the service unit 55 that should be permanently running, even when no message is available to be processed. This value of the minimum number can be specified for each service unit queue 57 respectively.

4. The maximum number of servers for each service unit 55. This maximum number corresponds to the number of server processes within the service unit 55 that should be running in a high workload situation when there are many business requests in the queue. This value of the maximum number can be specified for each service unit queue 57 respectively.

5. A threshold value which defines the number of servers that should be linked in order to quickly process the business requests in the respective service unit queue. The number of servers that should be linked is determined by the number of business requests in the queue (the queue depth) divided by the threshold value. The number of servers that should be linked in combination with the maximum number of servers eventually determines the number of servers 60–68 to be linked by each service unit 55.

6. A monitor time interval which defines the time interval after which the queuing monitor 85 repeats monitoring the current state of (each one of) the service unit(s) 55.

7. An autostart indication which determines whether the service unit 55 will be started immediately or first after the arrival of the trigger message 87.

All of the above parameters can be changed dynamically by the user in order to react on changing workload situations.

Figure 4:
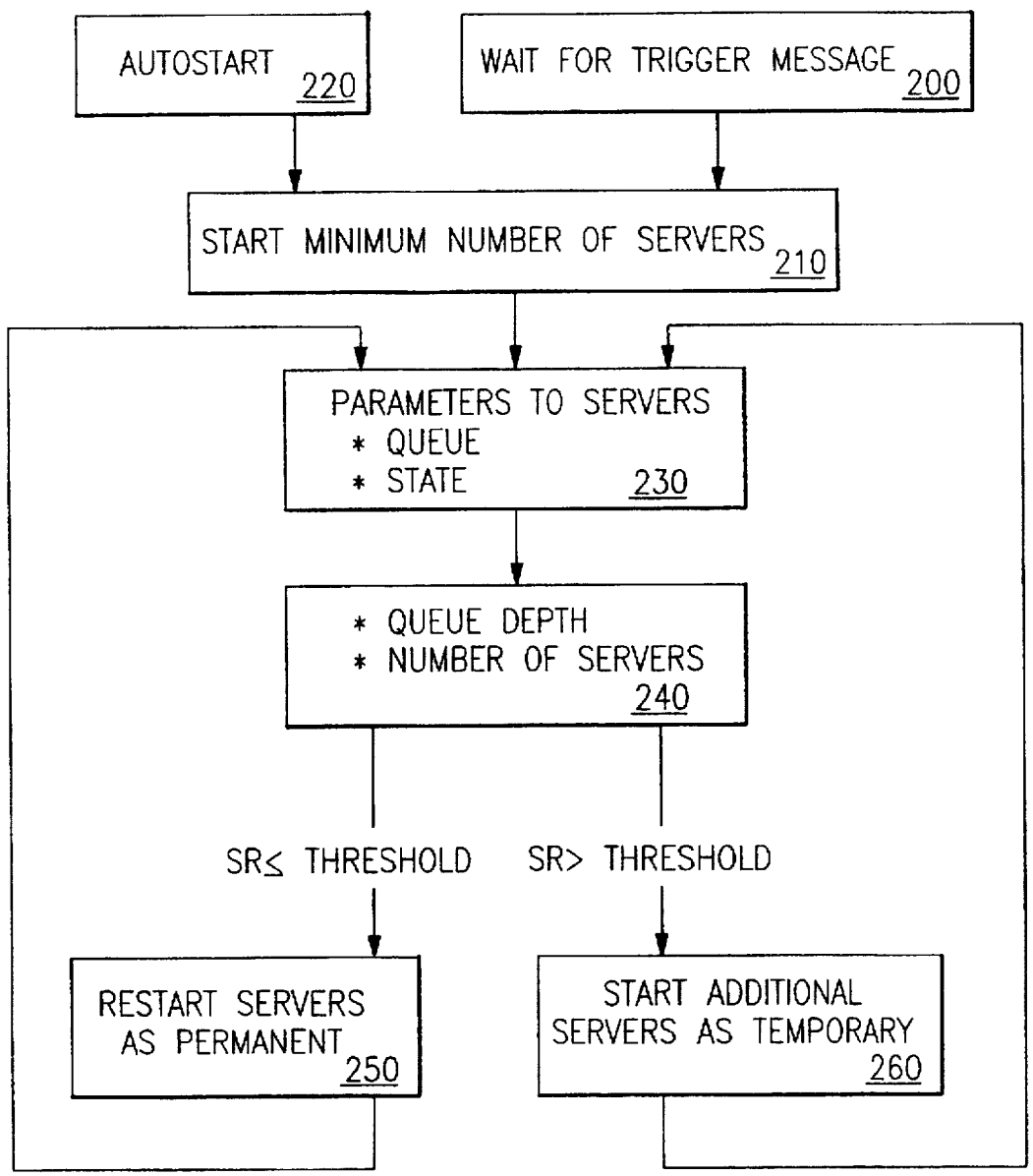
FIG. 4 shows the dynamic workload balancing method provided by the queuing monitor.

The queuing monitor 85 is running permanently and will be started automatically when the runtime environment is started. The queuing monitor 85 employs an optimized number of servers for each service unit 55, 104 and 120 to be monitored by the queuing monitor 85 in the service point 50. FIG. 4 shows the dynamic workload balancing method provided by the queuing monitor 85 or any other queuing monitor order to employ an optimized number of servers for each service unit to be monitored.

In a step 200, the queuing monitor 85 waits for the trigger message(s) 87 to arrive in the initiation queue 80 and then starts the specified minimum number of servers for each one of the service units 55, 104 and 120 in a step 210, as defined by the linked setup profile. However, dependent on the autostart indication in 220, the minimum number of servers of step 210 can also be started immediately by the queuing monitor 85 after the queuing monitor is started.

The queuing monitor 85 provides in a next step 230, successive to step 210, as parameters to the servers to be linked the name of the service unit queue which should be processed and a state indication. The state indication determines whether the respective server will be applied permanently or only temporarily. The permanent servers will be linked to the respective service unit until the end of the system, whereas the temporary execution managers will only be linked to the respective service unit in order to process one service request from the service unit queue. When this service request has been processed and there are no more service requests to be processed, the link to this temporary server will be terminated or the server will be terminated.

The servers linked as the minimum number of servers will be indicated as permanent servers, so that the number of permanent temporary servers per service unit is determined by the specified minimum number of servers given by the service unit parameters under normal conditions. The number of temporary servers per service unit, however, depends on the specified service unit parameters and on the number of service requests in the respective service unit queue 57.

When the specified monitor time interval is elapsed, the queuing monitor 85 inquires in a successive step 240 from each one of the service units 55 (104 and 120) the following information:

1. the current number of service requests in the respective service unit queues, which is also called the queue depth; and
2. the current number of servers linked to this service unit queue.

When the current number of service requests (SR) in the respective service unit 55 is less or equal than the specified threshold value, the queuing monitor 85 does not need to start additional servers. For integrity purposes the queuing monitor 85 verifies that the minimum number of the servers is running in a step 250. If there are less servers running than the specified minimum number of servers, the queuing monitor 85 re-starts just as many servers to reach this minimum number of servers.

If the number of service requests in the service unit queue 57 is greater than the specified threshold value, the queuing monitor 85 will link or start additional servers in a step 260 based on the following formula:

Servers to be linked/started=Queue depth/Threshold

If the sum of the calculated number of servers to be linked/started plus the number of the already running servers is larger than the specified maximum value of servers, the queuing monitor 85 will link or start just as many servers to reach this maximum number of servers.

Subsequent to either step 250 or 260 is again step 230, whereby the restarted servers of step 250 will be indicated as permanent servers whereas the additional servers started in step 260 will be indicated as temporary servers.

When the runtime environment is ended, the queuing monitor disables all monitored service unit queues and gives notice to the servers about this event.

Figure 5:
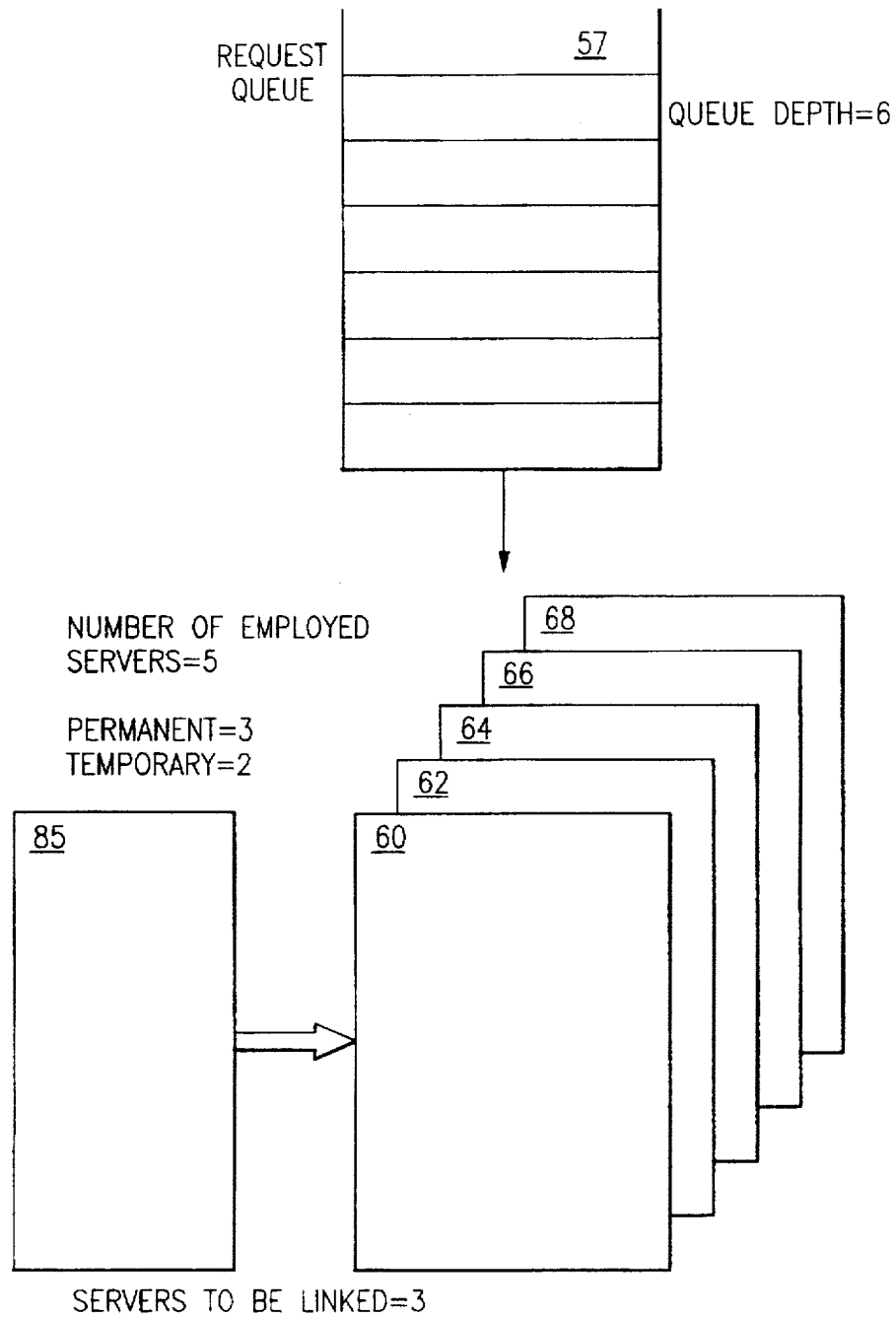
FIGS. 5 and 6 show examples of the dynamic workload balancing.
Figure 6:
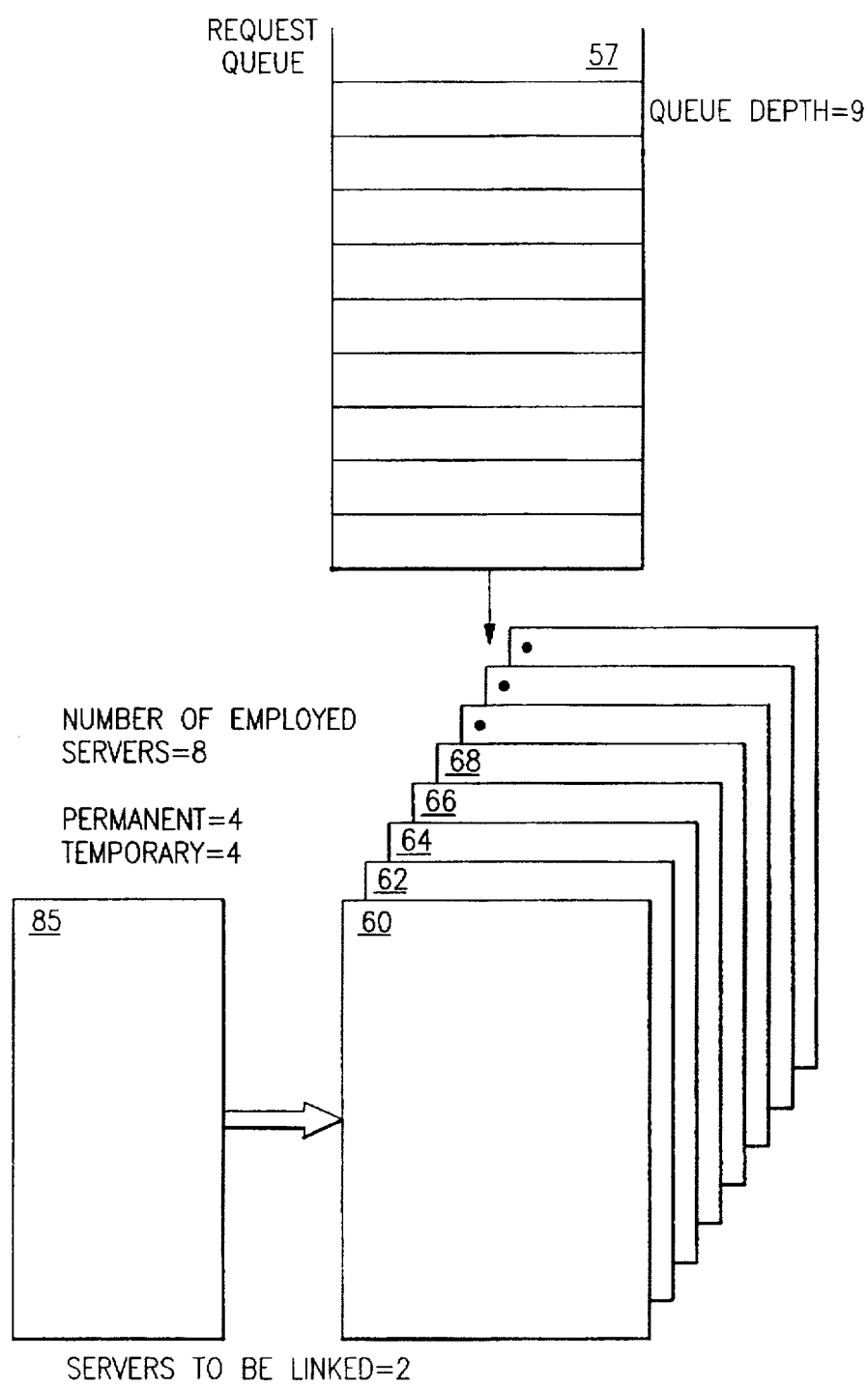

FIGS. 5 and 6 show examples of the dynamic workload balancing. In the example of FIG. 5, the queuing monitor 85 receives from the selected setup profiles 90–94 the following customer defined service unit parameters:

1. service unit queue 57 to be monitored;
3. minimum number of servers is 3;
4. maximum number of servers is 10; and
5. threshold value is 2

The queuing monitor 85 then requests the current queue depth of the service unit queue 57, and receives the message "queue depth is 6" in this example. The queuing monitor 85 further requests the current number of servers employed in service unit 55, and receives the message "current number of servers is 5 with 3 permanent and 2 temporary servers employed".

The queuing monitor 85 now determines the number of servers to be linked. The queue depth, in this example 6, divided by the threshold value, 2 results in 3 temporary servers which should be linked. However before linking the 3 temporary servers, the queuing monitor 85 checks if the total number of employed servers will not exceed the maximum number of servers (=10). 5 already employed servers plus 3 servers which should be employed would result in 8 servers in total and does not exceed the pregiven maximum number of 10 servers. That means that the queuing monitor eventually links 3 servers as temporary servers in order to quickly process the service requests from service unit queue 57.

In the example of FIG. 6, the queuing monitor 85 receives from the selected setup profiles 90–94 the same service unit parameters as in the example of FIG. 5, only differing in:

3. minimum number of servers is 4;
5. threshold value is 3.

The queuing monitor 85 then again requests the current queue depth of the service unit queue 57 and the current number of servers employed in service unit 55, and receives the message "queue depth is 9; the current number of servers is 8 with 4 permanent and 4 temporary servers employed".

The queue depth (=9) divided by the threshold value (=3) results in 3 temporary servers which should be linked. However, the total number of employed servers would exceed the maximum number of servers (=10), since 8 already employed servers plus 3 additional servers which should be employed would result in total 11 servers and therefore exceeds the pregiven maximum number of 10 servers by one. That means that the queuing monitor can only link 2 additional servers as temporary servers to the service unit queue 57.

Figure 7:
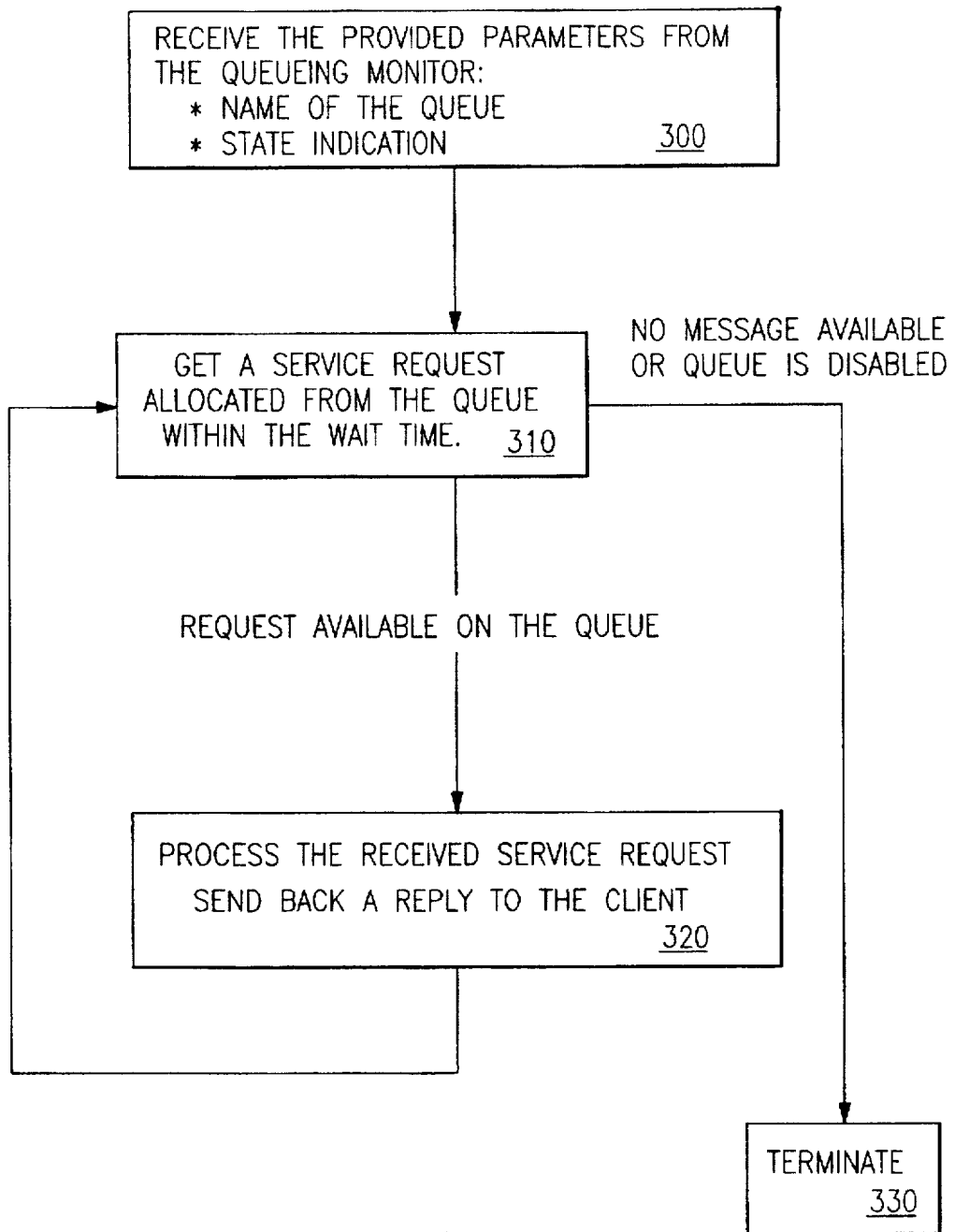
FIG. 7 shows the processing of the service requests by the servers.

FIG. 7 shows the processing of the service requests by the servers. In a step 300, the servers 60–68 receive the parameters provided by the queuing monitor 85 in step 230. These parameters comprise the name of the service unit queue which should be processed and the state indication whether the respective server will be applied permanently or only temporarily.

In a next step 310, the servers 60–68 wait for a predetermined wait time to get a service request allocated to them by the respective service unit queue 57. The state indication determines the value of the wait time of the servers. The wait time for temporary servers is a definable period of time, whereas the wait time for permanent servers is set as infinitive. In other words, the temporary servers only wait for a definable period of time that can also be zero, whereas the permanent servers wait until they eventually get a service request allocated from the service unit queue.

If there are service requests in the service unit queue 57 within the selected wait time, the service requests will be read and processed by the respective server in a step 320. When the service request is finally processed, the server issues a reply signal to the sender (client) of the processed service request and returns to step 310.

If there are no service requests in the service unit queue 57 within the selected wait time (e.g. when the queue is empty or disabled), the temporary servers will be terminated and its link to the service unit is removed in a step 330.

The above described queuing monitor and the server structure provides the possibility to achieve the best resource utilization and response time within the messaging system. The balancing method is fully dynamic and all configuration data can be changed while the system is running.

It is to be understood that the method provided in order to determine the number of servers to be linked is not limited to the embodiment as described above. Any other method can be applied which fulfills the requirement of dynamically adapting the current number of servers in the service unit to the current workload.

It is to be noted that in object-oriented applications the term "server" used in this description is synonymous with the term "server instance" (reference is given to: "Object-oriented Software Construction" by Bertrand Meyer, 1988, Prentice Hall International (UK) Ltd, ISBN 0-13-629049-3, page 71, in chapter 5.2.1).

Upon a reading of the present disclosure, it will be apparent to the skilled artisan that other embodiments of the present invention beyond those embodiments specifically described herein may be made or practiced without departing from the spirit of the invention. It will also be clear to the skilled artisan that numerous equivalent elements may be substituted for elements expressly disclosed herein as a part of a functional limitation described or claimed in means-for terms. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

The invention claimed is:

1. A transaction system comprising:

at least one service unit for processing service requests, wherein each service unit comprises:

a single queue for receiving and queuing incoming service requests;

a plurality of servers for executing the service requests in said single queue; and a queuing monitor for monitoring the servers and dynamically controlling a number of servers allocated to each of said at least one service unit without reliance on prior queue or server status information.

2. The transaction system according to claim 1 further comprising:

setup means for providing setup data to the queuing monitor, wherein the setup data includes:

the minimum and the maximum number of servers per service unit; and a threshold value which in combination with the minimum and the maximum number of servers per service unit allows the dynamically controlling of the number of servers employed by the service unit dependent on the number of service requests in the service unit.

3. The transaction system according claim 1 further comprising:

initiation means for initializing the queuing monitor.

4. A method for dynamically controlling the number of servers in a transaction system comprising at least one service unit for processing service requests, and wherein each service unit comprises a queue for receiving and queuing incoming service requests and a plurality of servers for executing the service requests, said method comprising:

monitoring how many current service requests are pending and how many current servers are allocated to each one of the service units;

determining a specified number of servers for use in each one of the service units dependent on how many service requests are pending and upon how many servers are allocated; and allocating said specified number of servers for each one of the service units without reliance on prior queue or server status information.

5. The method according to claim 4, wherein the servers allocated to each service unit comprise permanent and temporary servers, whereby each one of the temporary servers is only allocated to the service unit for a definable period of time and/or as long as at least one of the service requests in the queue is processable by the respective temporary server.

6. The method according to claim 4 wherein said allocating step comprises a step of allocating a minimum number of servers as permanent servers of the service unit.

7. The method according to claim 5 wherein said allocating step comprises a step of allocating a minimum number of servers as permanent servers of the service unit.

8. The method according to claim 4, wherein the optimized number of servers is determined by dividing the current number of business requests in the respective service unit by a definable threshold value to provide an indication of the number of additional servers to be started.

9. The method according to claim 5, wherein the optimized number of servers is determined by dividing the current number of business requests in the respective service unit by a definable threshold value.

10. The method according to claim 6, wherein the optimized number of servers is determined by dividing the current number of business requests in the respective service unit by a definable threshold value.

11. The method according to claim 4, wherein the number of servers does not exceed a definable maximum number of servers in the respective service unit.

12. The method according to claim 5, wherein the number of servers does not exceed a definable maximum number of servers in the respective service unit.

13. The method according to claim 6, wherein the number of servers does not exceed a definable maximum number of servers in the respective service unit.

14. The method according to claim 8, wherein the number of servers does not exceed a definable maximum number of servers in the respective service unit.

* * * * *